Feb. 17, 1925.
W. T. DOLLAR
1,527,032
TIRE INFLATING DEVICE
Filed Jan. 30, 1924
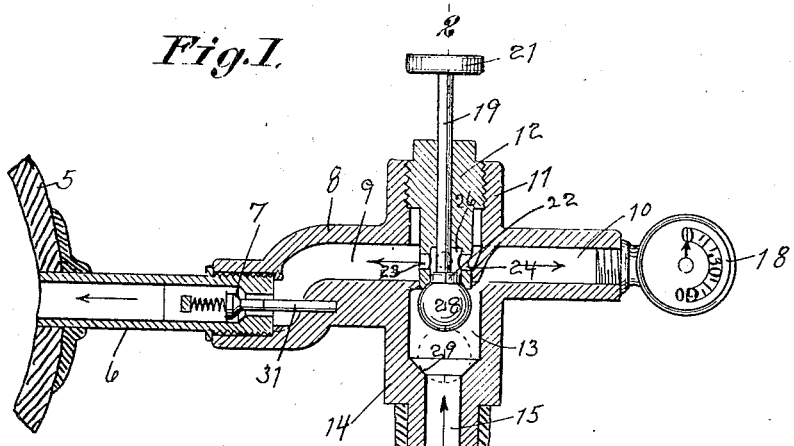
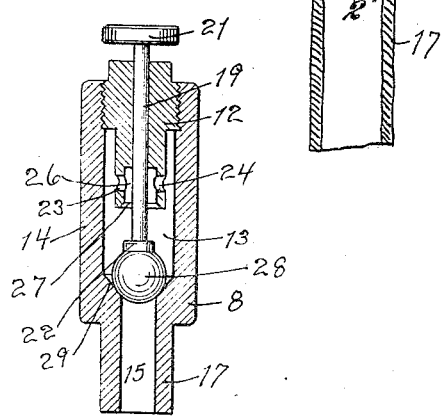
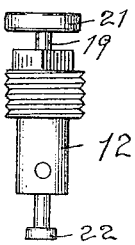
INVENTOR.
W. T. Dollar
BY Victor J Evans
ATTORNEYS.

Patented Feb. 17, 1925.

1,527,032

UNITED STATES PATENT OFFICE.

WILLIAM T. DOLLAR, OF MODESTO, CALIFORNIA.

TIRE-INFLATING DEVICE.

Application filed January 30, 1924. Serial No. 689,489.

*To all whom it may concern:*

Be it known that I, WILLIAM T. DOLLAR, a citizen of the United States, residing at Modesto, in the county of Stanislaus and State of California, have invented new and useful Improvements in Tire-Inflating Devices, of which the following is a specification.

This invention relates to improvements in tire inflating devices and has particular reference to a device for admitting air to a pneumatic tire and for registering the pressure within the tire, as well as the pressure within the supply system.

The principal object of this invention is to produce a device of this character which will eliminate the necessity of employing a separate gauge for testing the amount of air within the tire, as well as a separate gauge for testing the amount of air within the supply system.

A still further object is to produce a device which is simple in construction, cheap to manufacture, and one which can be readily applied to any standard air hose.

A still further object is to produce a device which will eliminate the use of springs as is commonly employed.

Other objects and advantages will be apparent during the course of the following description.

In the accompanying drawings forming a part of this specification, and in which like numerals are employed to designate like parts throughout the same, Figure 1 is a cross section of my device, showing the gauge in elevation, Figure 2 is a cross section taken on the line 2—2 of Figure 1, and Figure 3 is a detail view of the valve-operating mechanism.

At the present time in inflating a tire, the operator first presses his gauge or a borrowed gauge under the stem of the tire to ascertain the amount of air within the tire. Then he removes this gauge, applies the air hose until he thinks the proper amount of air has entered into the tire and again makes a test with his air gauge. This is a slow operation, wasteful of air and is many times repeated until the desired amount is placed within the tire. Moreover, with this standard air equipment it is impossible to ascertain, without going to a remote point, whether the pressure within the supply system is sufficient for the proper inflation.

Applicant has devised a device which eliminates this trouble and by referring to the drawing, the numeral 5 designates a portion of an inner tube, the numeral 6 the customary stem and the numeral 7 the customary valve mounted within the stem.

At 8 is shown a casting having an outlet port 9. At 11 is shown an offset within which is mounted a plug 12, which plug extends across the outlet port 9 so as to prevent communication between a valve chamber 13 and the outlet port 9. This valve chamber is formed within an offset 14 which is positioned diametrically opposite the offset 11.

A reduced portion 16 serves as a securing means for an air supply hose 17 and is bored so as to form an inlet port 15. A pressure gauge 18 is secured to the casting 8 and communicates with a passage 10 having communication with the valve chamber 13. The plug 12 is centrally bored and has slidably mounted therein a plunger rod 19 having a thumb piece 21 upon its outer end and a pusher head 22 upon its opposite end. The portion of the plug within the outlet port 9 is provided with ports 23 and 24, which ports are joined by a chamber 26 and also has formed on its end a seat 27 for the reception of a ball valve 28. This ball valve is adapted to be moved from its full line position of Figure 1 to its dotted line position of this figure so as to contact a seat 29 formed within the offset 14.

The operation of my device is as follows:—

Assuming that the air supply hose 17 has been secured to the reduced portion 16 of the casting and the air turned on, the air will enter the valve chamber 13 and cause the ball 28 to seat against the valve seat 27, thus preventing any air from escaping to the outlet port 9. The air, however, will pass into the passage 10 and register upon the gauge 18. This registration will be the pressure within the air supply pipe. The operator now places the device over the end of the stem 6, with the result that the pin 31, positioned within the casting, will depress the valve 7 and allow air to escape into the port 9.

By now pressing the thumb against the thumb-piece 21 a sliding movement of the rod 19 will be caused, with the result that the pusher head 22 will force the ball to its dotted line position of Figure 1 or full line position of Figure 2. The air then within the outlet port 9 will immediately escape through the ports 23 and 24 to the chamber 26, valve chamber 13, passage 10 and register upon the gauge 18. This registration will be the pressure within the tire.

By now slightly releasing the thumb, the ball will be forced from the seat 29 and air can then pass around the ball through the valve chamber 13, chamber 26, out through ports 23 and 24, outlet port 9, to the interior of the tire. The operator can then press the ball against the seat 29 again and reread the pressure within the tire, without removing the device from the tire as is now customary. If the inflation appears to be slow he again releases the finger piece entirely and immediately ascertains whether there is sufficient pressure in the air pipe.

It will thus be seen that I have provided a device which is extremely simple in construction, quick to use and one in which the valve may be easily removed and replaced if the same becomes worn.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, a casting having offsets diametrically arranged therein, an outlet port formed in said casting, a plug secured in one of said offsets, a chamber formed in the other of said offsets, an inlet port communicating with said chamber, a valve seat formed in said chamber, a valve seat formed on said plug, a ball positioned within said chamber, and means for moving said ball from said valve seat on said plug to said valve seat in said chamber.

2. In a device of the character described, a casting, an outlet port formed in said casting, a valve depressing pin positioned in said outlet port, a plug secured to said casting and extending into said port, a plurality of ports formed in said plug, a chamber formed in said plug and communicating with said last mentioned ports, a valve seat formed in said plug, a ball adapted to contact said valve seat, a gauge secured to said casting, a valve chamber formed in said casting and having communication with said gauge, and an inlet port formed in said casting, said inlet port communicating with said valve chamber.

3. In a device of the character described, a casting, an outlet port formed in said casting, a valve depressing pin positioned in said outlet port, a plug secured to said casting and extending into said port, a plurality of ports formed in said plug, a chamber formed in said plug and communicating with said last mentioned ports, a valve seat formed in said plug, a ball adapted to contact said valve seat, a gauge secured to said casting, a valve chamber formed in said casting and having communication with said gauge, an inlet port formed in said casting, said inlet port communicating with said valve chamber, a valve seat formed adjacent said inlet port, and means for moving said ball from said first mentioned valve seat to said second mentioned valve seat.

In testimony whereof I affix my signature.

WILLIAM T. DOLLAR.